US012790033B2

(12) United States Patent
Lopez et al.

(10) Patent No.: US 12,790,033 B2
(45) Date of Patent: Nov. 10, 2026

(54) METHOD AND SYSTEM FOR WIRELESS POWER TRANSMISSION IN SPACE

(71) Applicant: Politecnico Di Torino, Turin (IT)

(72) Inventors: Francesco Lopez, Turin (IT); Anna Mauro, Turin (IT); Giuseppe Monteleone, Turin (IT); Domenico Edoardo Sfasciamuro, Turin (IT); Andrea Villa, Turin (IT)

(73) Assignee: POLITECNICO DI TORINO, Turin (IT)

( * ) Notice: Subject to any disclaimer, the term of this patent is extended or adjusted under 35 U.S.C. 154(b) by 0 days.

(21) Appl. No.: 19/109,303

(22) PCT Filed: Sep. 14, 2023

(86) PCT No.: PCT/IB2023/059144
§ 371 (c)(1),
(2) Date: Mar. 6, 2025

(87) PCT Pub. No.: WO2024/057258
PCT Pub. Date: Mar. 21, 2024

(65) Prior Publication Data

US 2026/0084843 A1 Mar. 26, 2026

(30) Foreign Application Priority Data

Sep. 16, 2022 (IT) ........................ 102022000018984

(51) Int. Cl.
*B64G 1/42* (2006.01)
*B64G 1/10* (2006.01)
(Continued)

(52) U.S. Cl.
CPC ......... *B64G 1/4282* (2023.08); *B64G 1/1078* (2013.01); *B64G 1/1085* (2013.01);
(Continued)

(58) Field of Classification Search
CPC .. B64G 1/4282; B64G 1/1078; B64G 1/1085; B64G 1/2423; B64G 1/443; H02J 50/30; H02J 50/40
See application file for complete search history.

(56) References Cited

U.S. PATENT DOCUMENTS 3,825,211 A * 7/1974 Minovitch ............ B64G 1/409
244/171.1
3,933,323 A * 1/1976 Dudley .................. H02J 50/20
372/18

(Continued)

OTHER PUBLICATIONS

International Search Report and Written Opinion dated Jan. 24, 2024, issued in PCT Application No. PCT/IB2023/059144, filed Sep. 14, 2023.

(Continued)

*Primary Examiner* — Medhat Badawi
(74) *Attorney, Agent, or Firm* — Workman Nydegger

(57) ABSTRACT

Described herein is a method for wireless transmission of energy in space, wherein a constellation of transmitting satellites orbiting around a celestial body, such as the planet (P) Earth or the Moon (L), are equipped with a laser apparatus for sending a beam of coherent electromagnetic waves to an orbiting satellite or another receiving target, such as a mobile vehicle or a fixed base on said generic celestial body, in order to transmit energy thereto. The total power transmitted is divided among the orbiting satellites in the constellation, resulting in less contraindications than in the case of a single transmitting system with equivalent total power. The advantage of such division among a constellation of satellites mainly consists of shorter periods of solar eclipse, since sunlight is necessary for the operation of the transmission system. The receiving target or satellite converts the beam of electromagnetic waves into electric energy.

15 Claims, 13 Drawing Sheets

(a) (b)

(51) Int. Cl.

*B64G 1/24* (2006.01)
*B64G 1/44* (2006.01)
*H02J 50/30* (2016.01)
*H02J 50/40* (2016.01)

(52) U.S. Cl.

CPC ........... *B64G 1/2423* (2023.08); *B64G 1/443* (2013.01); *H02J 50/30* (2016.02); *H02J 50/40* (2016.02)

(56) References Cited

U.S. PATENT DOCUMENTS

| | | | | |
|---|---|---|---|---|
| 3,989,994 | A * | 11/1976 | Brown | H02M 11/00 244/172.7 |
| 4,305,555 | A * | 12/1981 | Davis | B64G 1/44 244/172.7 |
| 4,360,741 | A * | 11/1982 | Fitzsimmons | H02J 50/70 307/151 |
| 4,368,415 | A * | 1/1983 | Henderson | H02J 50/20 310/306 |
| 5,260,639 | A * | 11/1993 | De Young | H10F 10/144 244/1 R |
| 5,652,750 | A * | 7/1997 | Dent | H04B 7/18532 455/12.1 |
| 6,407,535 | B1 * | 6/2002 | Friedman | B64D 41/00 244/1 R |
| 6,967,462 | B1 * | 11/2005 | Landis | H02J 50/80 320/109 |
| 7,070,151 | B2 * | 7/2006 | D'Ausilio | B64G 1/503 244/171.1 |
| 7,078,666 | B2 * | 7/2006 | Tuominen | H04B 10/807 398/118 |
| 7,216,833 | B2 * | 5/2007 | D'Ausilio | B64G 1/1078 244/171.1 |
| 7,216,834 | B2 * | 5/2007 | D'Ausilio | B64G 1/413 244/172.5 |
| 7,423,767 | B2 * | 9/2008 | Steinsiek | B64G 1/4282 356/614 |
| 7,636,157 | B2 * | 12/2009 | Wang | G01J 3/0218 356/301 |
| 7,773,645 | B2 * | 8/2010 | Wang | H01S 5/141 356/301 |
| 7,786,419 | B2 * | 8/2010 | Hyde | H02J 50/40 455/343.1 |
| 8,008,615 | B2 * | 8/2011 | Hyde | H02J 50/80 372/38.1 |
| 8,026,466 | B2 * | 9/2011 | Hyde | H02J 50/20 455/343.1 |
| 8,058,609 | B2 * | 11/2011 | Hyde | H02J 50/20 455/343.1 |
| 8,168,930 | B2 * | 5/2012 | Hyde | H02J 50/20 455/343.1 |
| 8,264,101 | B2 * | 9/2012 | Hyde | H02J 50/10 307/80 |
| 8,748,788 | B2 * | 6/2014 | Hyde | H02J 50/80 455/343.1 |
| 9,038,957 | B1 * | 5/2015 | Fork | B64G 1/44 244/158.4 |
| 9,090,315 | B1 * | 7/2015 | Stone | E21B 47/135 |
| 9,312,701 | B1 * | 4/2016 | Mor | H02J 50/30 |
| 9,837,859 | B2 * | 12/2017 | Hiebl | H04B 10/807 |
| 9,866,075 | B2 * | 1/2018 | Slepoy | H04B 10/807 |
| 10,081,446 | B2 * | 9/2018 | Stone | B64G 1/62 |
| 11,322,991 | B2 * | 5/2022 | Alpert | H04B 10/564 |
| 11,356,183 | B2 * | 6/2022 | Golan | H04B 10/807 |
| 11,411,441 | B2 * | 8/2022 | Woo | H02J 50/40 |
| 12,206,036 | B2 * | 1/2025 | Stone | H02S 40/44 |
| 12,525,827 | B2 * | 1/2026 | Berte | H02J 50/30 |
| 2011/0156498 | A1 * | 6/2011 | Criswell | H02J 50/27 244/158.1 |
| 2020/0144865 | A1 * | 5/2020 | Vilenskiy | H02J 50/23 |
| 2021/0036210 | A1 * | 2/2021 | Castagna | H10N 30/074 |
| 2023/0203831 | A1 * | 6/2023 | Nakada | A61G 17/08 701/451 |
| 2026/0045828 | A1 * | 2/2026 | AlEryani | H02J 50/001 |
| 2026/0045830 | A1 * | 2/2026 | Fujii | H02J 50/20 |

OTHER PUBLICATIONS

Italian Search Report dated Apr. 28, 2023, issued in Italian Application No. 102022000018984, filed Sep. 16, 2022.

Narayanan Komerath et al., *Retail Beamed Power for a Micro Renewable Energy Architecture: Survey,* 2010 International Symposium on Electronic System Design, IEEE Computer Society, pp. 44-49.

Mark W. Stavnes, *An Analysis of Power Beaming for the Moon and Mars,* Proceedings of the 27th Intersociety Energy Conversion Engineering Conference (IECEC), vol. 2, published Aug. 3, 1992, XP000366077, pp. 293-298.

* cited by examiner

METHOD AND SYSTEM FOR WIRELESS POWER TRANSMISSION IN SPACE

BACKGROUND OF THE DISCLOSURE

1. The Field of the Disclosure

The invention relates, in general, to the field of wireless transmission of energy in space.

2. The Relevant Technology

As is known, in space missions and activities involving orbiting satellites or stations, energy production, accumulation and (internal) distribution are fundamental aspects to ensure the proper operation of all on-board equipment and instrumentation, as well as for preserving human life whenever manned vehicles are employed.

The primary source of energy is the Sun, whose radiations in space, i.e., outside the terrestrial atmosphere, cover the entire electromagnetic spectrum, since they are not altered by reflection, refraction and filtration phenomena, which, on the contrary, affect solar radiations as they reach the Earth.

Solar energy is converted into electric energy by means of photovoltaic panels, thus becoming available for on-board use to operate devices and telecommunications systems, charge batteries, etc.

For this reason, orbiting stations as well as satellites and, in general, all spacecraft, are equipped with photovoltaic panels and associated apparatuses for converting solar energy into electric energy; the latter is generated as direct current, but may be transformed into alternating current as required.

This energy management for space applications has been known and established for years, and is now reliably employed for most space applications. However, it suffers from a few drawbacks that reduce its effectiveness.

A first drawback is that conversion of solar energy into electric energy by means of photovoltaic panels occurs with an efficiency of 25-35%; therefore, even though the solar energy that irradiates the photovoltaic panels is virtually unlimited, the final result (i.e., the electric energy obtained from the panels) is nonetheless limited by the efficiency and dimensions of the panels themselves, which have to be transported in space for this very purpose.

Furthermore, it is known that photovoltaic panels have a limited service life, i.e., a lifespan after which their efficiency decreases and energy production is no longer satisfactory.

Such lifespan is measured in years (typically 5 to 15 years, according to the case), and implies that the panels need to be replaced after a certain period of time. However, this is not actually done in space, resulting in the satellite with degraded panels being put out of service.

As a corollary, when high power is required, the technical solutions currently adopted try to solve this problem by using oversized solar-panel power generation systems or by exploiting nuclear generators. When such techniques cannot be implemented, e.g., on mobile ground vehicles or small orbiting probes, it is necessary to limit the available amount of energy and hence the spacecraft's performance.

SUMMARY OF THE DISCLOSURE

From the above examination one can understand, although generally and in broad terms, that there is at present a need for improving the currently most widespread mode of energy management, especially when high power and/or long distances between points in space are involved.

The technical problem at the basis of the invention is, therefore, to fulfil this need; in other words, the invention aims at providing a method for energy management in space which can overcome the above-mentioned drawbacks and limitations of those currently known in the art.

The idea that solves this problem is to produce electromagnetic energy in a plurality of orbiting space units, such as satellites, stations, probes or the like, and to remotely transmit it as electromagnetic radiations towards a point in space, intercepting a receiver installed on an orbiting satellite or on the surface of a celestial body.

In accordance with a preferred embodiment, energy is remotely transmitted by means of laser beams, i.e., coherent monochromatic waves in the visible and/or infrared range.

From a technical viewpoint, the advantage of this solution lies in the possibility of transmitting energy to space regions that are not reached by solar radiation, which is the primary source of electric power employed in all current solutions.

In accordance with a preferred embodiment, the electromagnetic radiations or laser beams are emitted by a network or constellation of orbiting satellites, so as to provide energy transmission unaffected by periods of solar eclipse.

The features of the method according to the invention are specifically set out in the appended claims. The invention further comprises a system for transmitting energy in space, the features of which are also set out in the claims.

BRIEF DESCRIPTION OF THE DRAWINGS

Such features, as well as the effects deriving therefrom and the advantages achieved by the invention, will become more apparent in light of the following description of two preferred, but non-limiting, examples of embodiment of the invention, wherein reference will be made to the annexed illustrative, but non-limiting, drawings, wherein:

FIG. 4(*b*) shows the ground track of the satellites of FIG. 3(*b*) and the point on the surface that represents the transmission target;

DETAILED DESCRIPTION OF THE PREFERRED EMBODIMENTS

Figure 1:
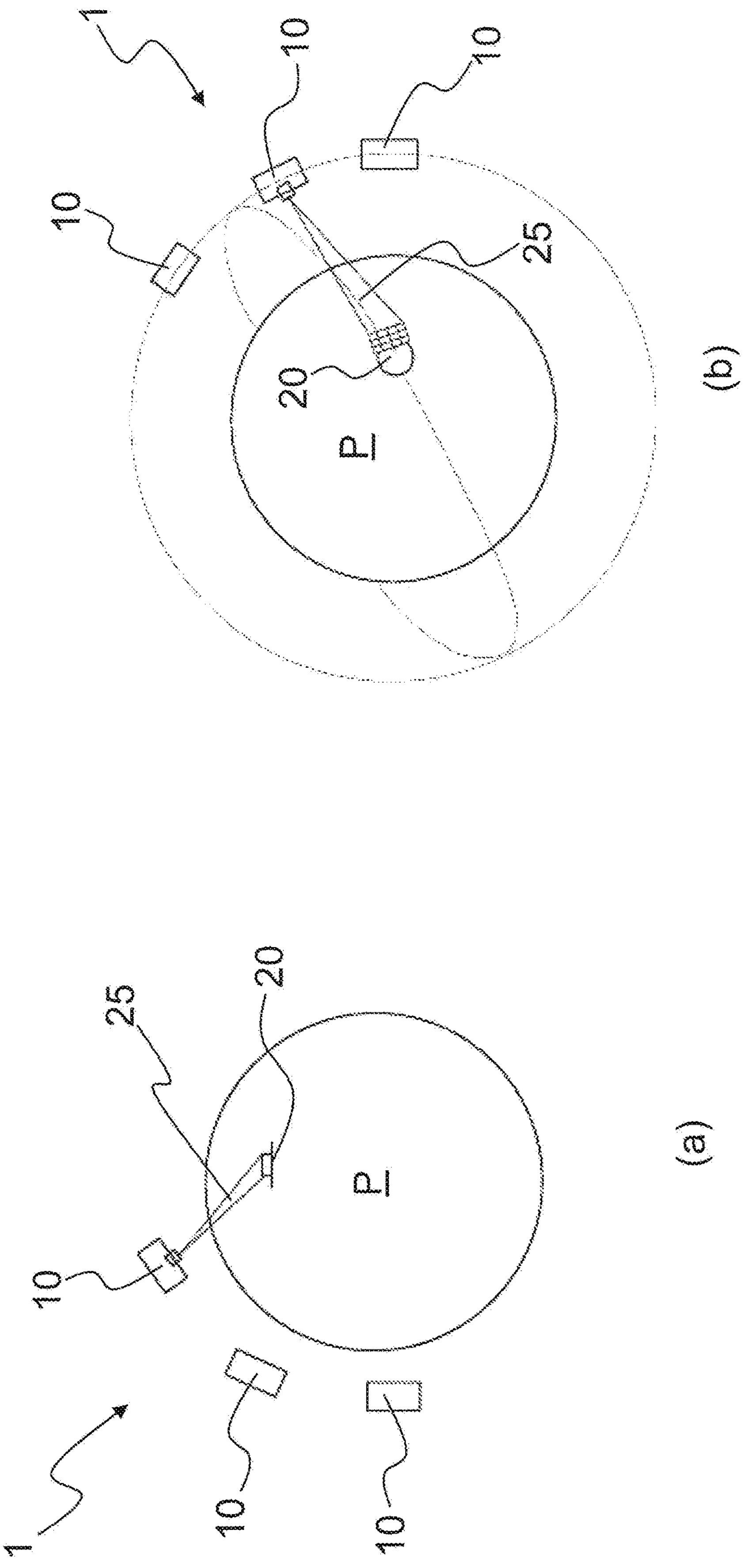
FIG. 1(*a*), 1(*b*) are schematic representations of respective embodiments of the method according to the invention.

With reference to the above listed figures, numeral 1 designates as a whole a system for energy transmission in accordance with the invention, which comprises a plurality of satellites 10 orbiting around a planet or a celestial body P, which may be the Earth, as in the case illustrated in the drawings, or the Moon, Mars, etc.

For brevity's sake, reference will only be made in the following description to a planet (or planets) P of the solar system, such as Earth, but this should not be understood as a limiting factor, and the following explanation shall also apply to other celestial bodies like the Moon, asteroids, and the like.

The satellites 10 may be equally spaced or not, and may be all disposed on the same orbit O (thus substantially constituting a constellation or network of transmitting satellites, each one being periodically in direct contact with a target 20, so as to be able to transmit energy towards it in the form of a beam 25 of coherent electromagnetic waves.

Preferably, the gravitational orbit O of the satellites 10 is a low orbit, i.e., at a height of a few hundred kilometres (about 400-1,000 km) in the examples considered herein referring to the Earth and the Moon.

The same criteria are also applicable to other planets or celestial bodies, such as the Moon or Mars.

In accordance with the invention, the distance between a satellite 10 and the target 20, for the transmission of energy to the latter, is preferably shorter than 3,000 km.

Furthermore, the electromagnetic waves used for wireless energy transmission are preferably those of a laser beam 25, or anyway coherent monochromatic waves with a wavelength in the visible range (i.e., approx. 400 to 700 nm) or in the near-infrared range (approx. 700 nm to 1.4 μm).

The generation of the beam 25 of electromagnetic radiations can be obtained either by means of electric energy supplied by photovoltaic panels associated with each transmitting satellite 10 or, preferably, directly from sunlight focused and processed through suitable optics and then processed by electronic means to make it coherent and monochromatic.

Figure 2:
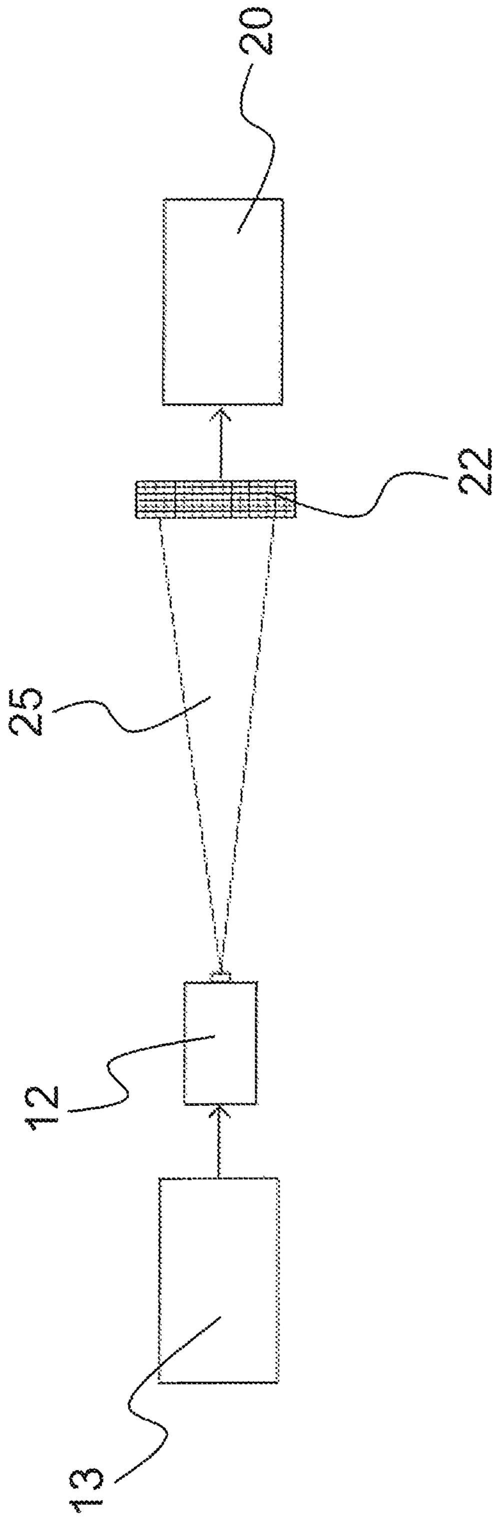
FIG. 2 is a schematic representation of a system for transmitting/receiving energy in the embodiments of FIGS. 1(*a*), 1(*b*)
Figure 3B:
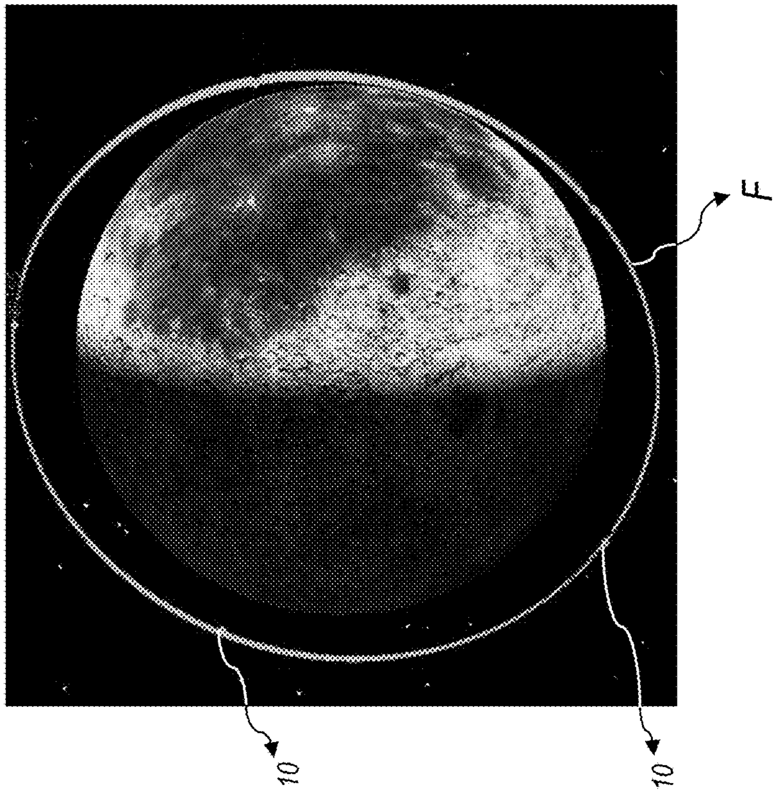
FIGS. 3(*a*), 3(*b*) show the orbital arrangement of a set of satellites used for implementing the method according to the invention.
Figure 3A:
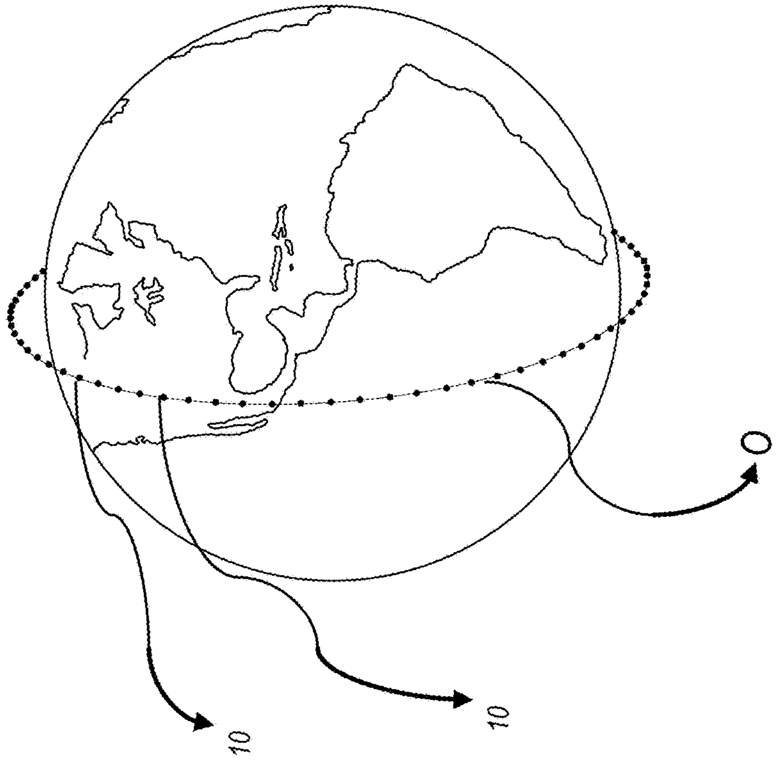
Figure 4A:
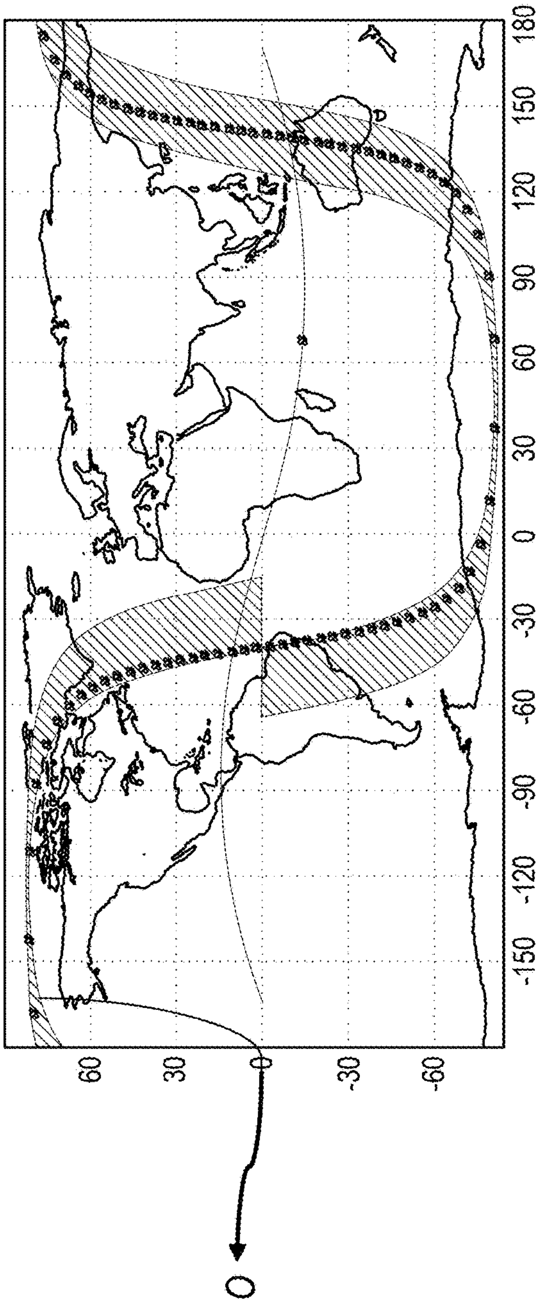
FIG. 4(*a*) shows the ground track of the satellites of FIG. 3(*a*) and of the receiving satellite that represents the transmission target.
Figure 4B:
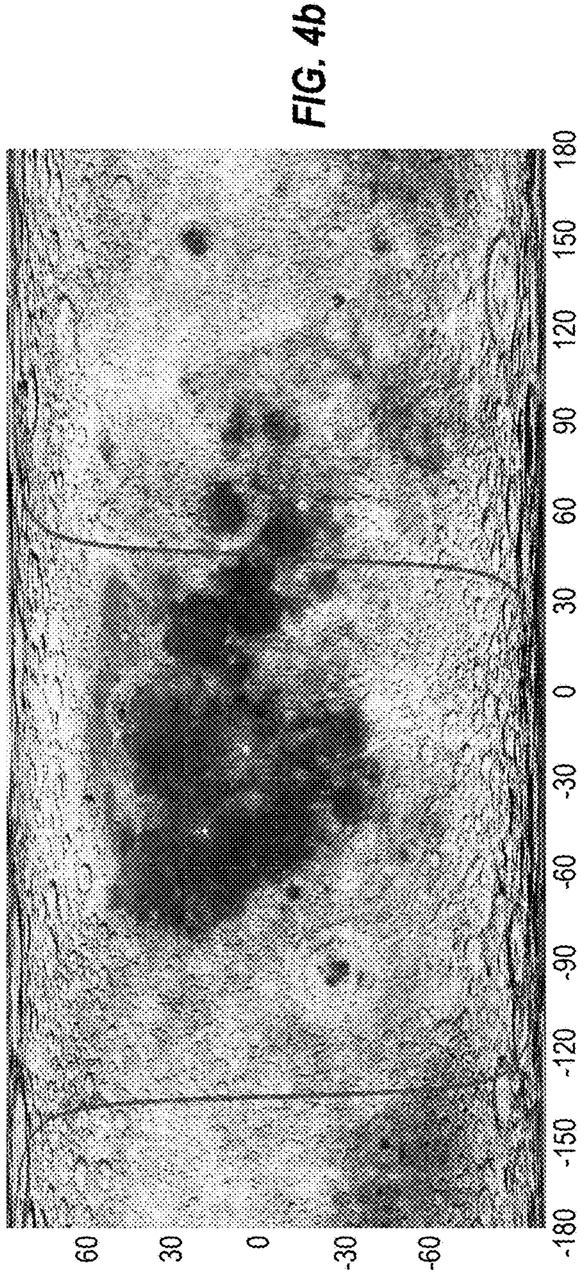

FIG. 2 schematically illustrates an apparatus 12 for transmitting a laser beam 25, installed aboard a satellite 10.

The apparatus 12 preferably comprises a solid-state laser powered by an energy source 13, which, depending on the selected embodiment, can supply electric energy by using, preferably, a photovoltaic system for converting the solar energy incident on the satellite 10, or an optic and/or electronic system for concentrating the solar radiations and obtaining a beam of coherent monochromatic light in the above-mentioned frequency ranges.

The beam 25 is remotely transmitted to a target 20 equipped with a receiving structure or apparatus 22 configured substantially as a matrix or the like, which will be further discussed below.

In this context, it must be pointed out that the apparatus 12 comprises also a system for controlling the orientation of the beam 25 (not shown in the drawings), in order to keep pointing towards the target 20 during the orbital motion of the satellite 10 on which the apparatus 12 is arranged.

In fact, as shown in FIGS. 1(*a*), 1(*b*), the target 20 may be either on a planet P, e.g., a mobile vehicle or a fixed base adapted for reception of the beam 25, or in orbit as another body or satellite orbiting around the Earth, the Moon or another celestial body.

In both cases, the orbital motion of the satellite 10 transmitting the energy beam 25 requires continuous beam pointing control, as a function of its speed relative to the target 20.

To this end, the apparatus 12 comprises electro-mechanical means (not shown in the drawings), such as electric motors, transmissions (e.g., gear transmissions, belt transmissions, etc.), ball joints, and any other means that may be necessary for orienting the beam 25.

The adopted electromechanical solutions may vary according to the type of apparatus 12, the size and power of the laser beam 25, the speed of the satellite 10, the distance from the target 20, and other structural-functional parameters of the system 1 for wireless energy transmission.

Some of such parameters are listed below with reference to one possible application of the system for wireless energy transmission conceived by the Applicants (briefly named ORiS).

The constellation of satellites 10 can be arranged in an orbit around the Earth, defined by the data contained in the following table.

| ORIS's Orbit Parameters | |
|---|---|
| Semi-major Axis | 7051 km |
| Eccentricity | 9.37465e−16 |
| Inclination | 98.0961 deg |
| RAAN | 152 deg |
| Argument of Periapsis | 0 deg |
| True Anomaly | 0:4.5:360 deg |

Figure 5:
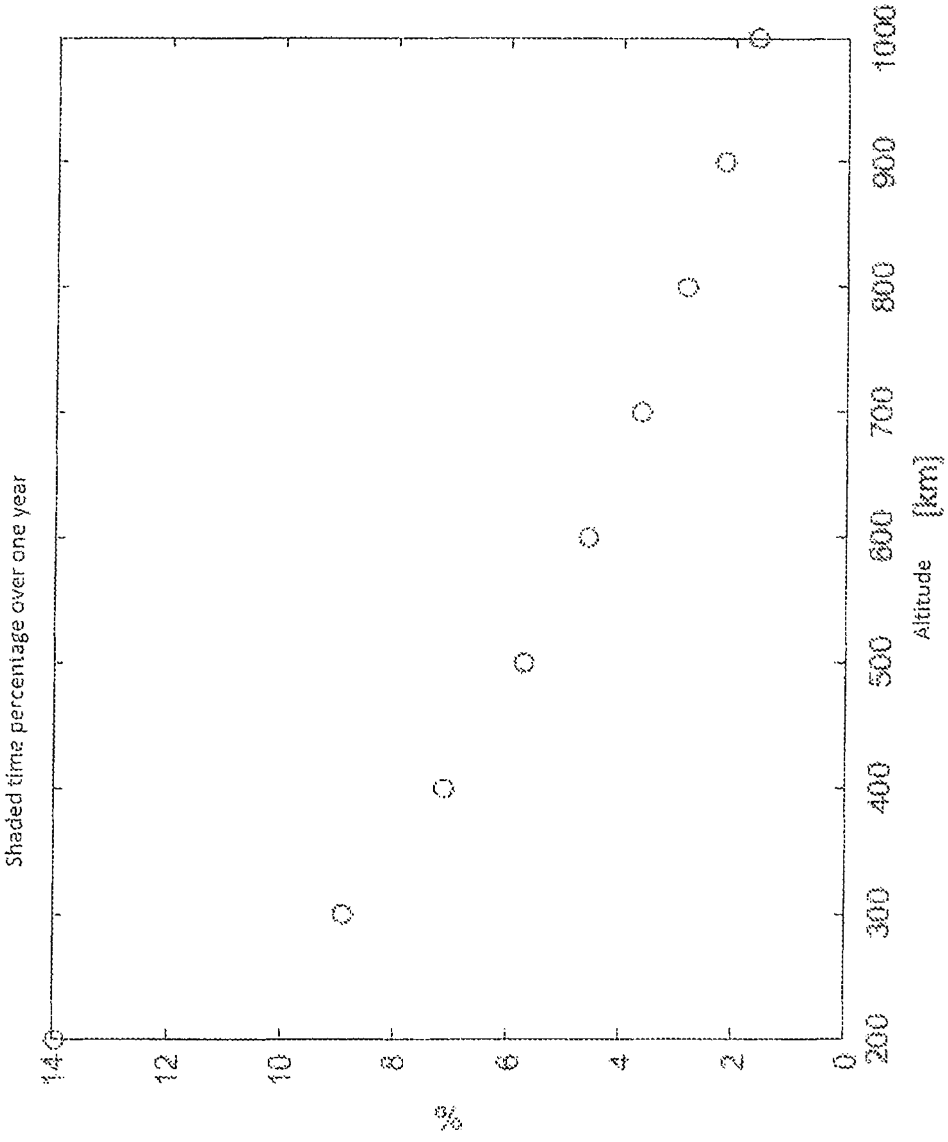
FIG. 5 is a graph showing the eclipse time percentage of the satellites of FIG. 3(*a*) over one year.
Figure 6:
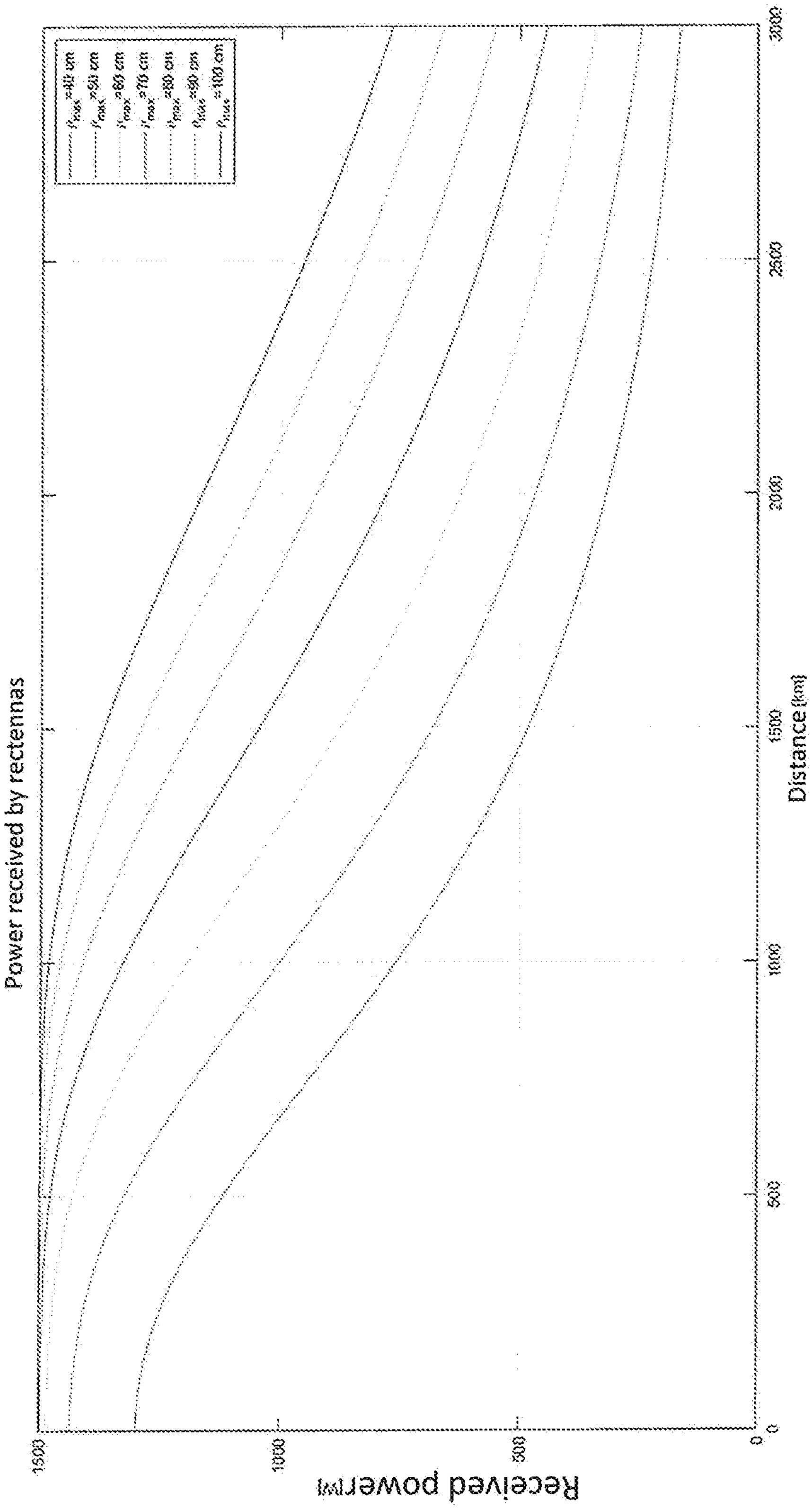
FIG. 6 is a graph that shows the power received by rectifier antennas (rectennas) used in the invention, in relation to their distance and divided according to the size of the receiver used as a transmission target and installed on a receiving satellite.

As can be seen in FIGS. 5 and 6, this is an orbit at an approximate distance of 680 km from the Earth's surface which passes through the poles, and which covers a band on Earth which extends evenly in both hemispheres; this results in a solar eclipse time, i.e., the time during which the satellites are not irradiated by sunlight, of approximately 2-10% of the orbital period, as shown in the graph of FIG. 5.

For simplicity, it was assumed that the energy source 13 of the laser beam is electric energy supplied by solar panels associated with the orbiting satellites 10.

The solar panels of each satellite 10 were sized considering a degradation factor of 0.77, a loss due to incident ray inclination of 0.99, a yearly degradation factor of 3.75%, a service life of the satellite of 5 years. A mean solar intensity in LEO of 1,367 W/$m^2$, a solar panel efficiency of 32%, a consumption of 100 W for powering the satellite's subsystems, a consumption of 1,000 to 1,500 W by the laser apparatus 12 with 60% efficiency, and an eclipse time amounting to 2% of the orbital period were also assumed.

The resulting area of the solar panel was approximately 10 $m^2$.

The power received as a function of distance follows, according to a Gaussian model, the following law:

$$P_r(z) = P_0\left[1 - e^{-\frac{2\rho_{max}^2}{w^2(z)}}\right]$$

where $P_o$ is the laser's power output (1,500 W), $\rho_{max}$ is the maximum radius of the receiver apparatus 22, and w(z) is the radius of the laser beam 25 as the distance varies, calculated as $$w(z) = w_0\sqrt{1+\left(\frac{z}{z_0}\right)^2}$$

where $w_0$ is the radius of the laser beam exiting the satellite 10; $z_0$ is calculated as $$z_0 = \frac{\pi w_0^2}{\lambda}$$

where λ is the wavelength of the laser beam 25; it can be obtained from diagrams like the one shown in FIG. 6, which shows the curve of the power received by the receiver apparatus 22 (matrix of rectifier antennas, or rectennas, in the diagram of FIG. 6).

In low Earth orbits, the constellation of satellites 10 comes in contact with the target satellite 20 in two regions of the orbit. Assuming that transmission can occur over a maximum distance of 3,000 km, it is possible to calculate the time over which power can be transmitted to a receiving satellite 20.

Figure 7:
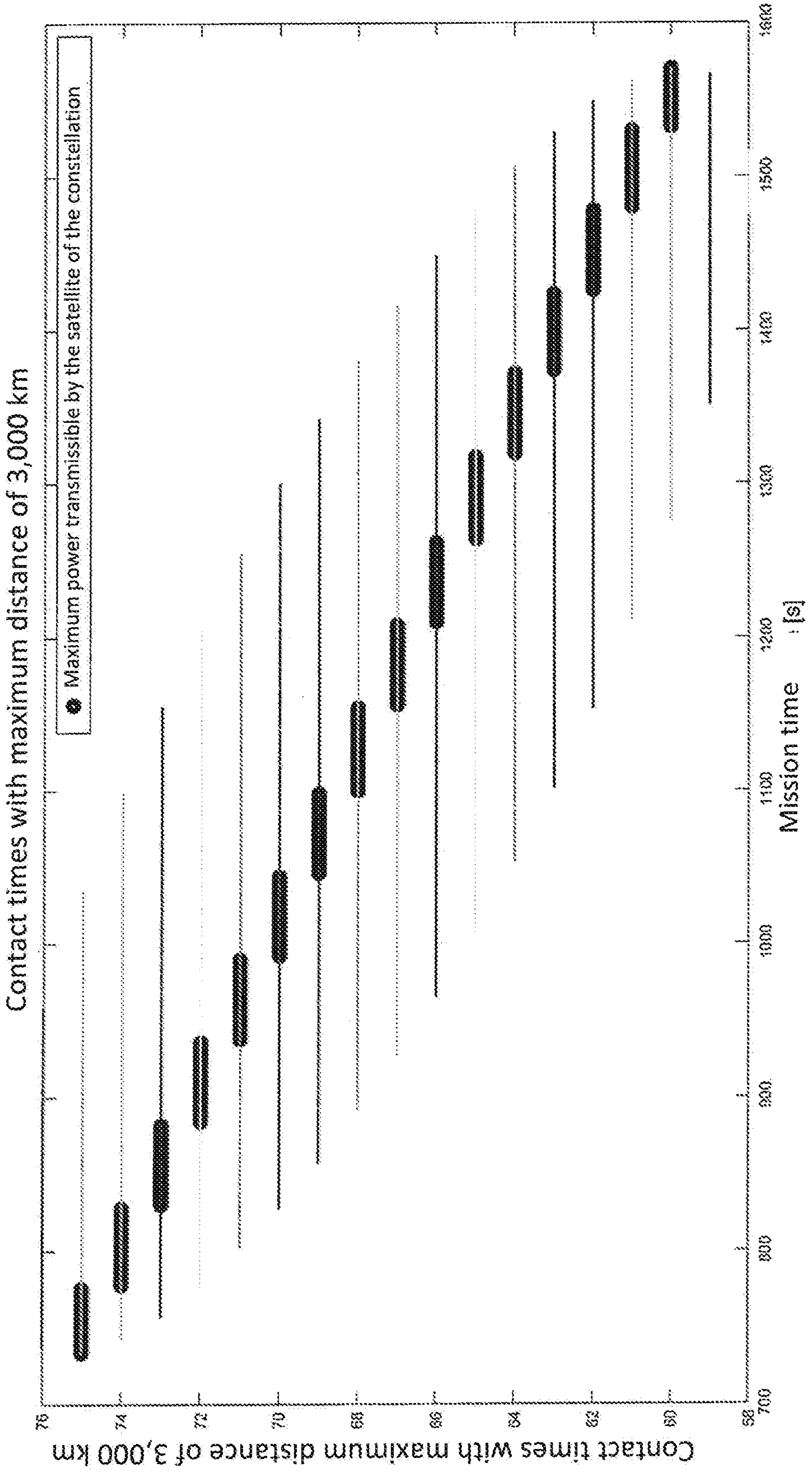
FIGS. 7 and 8 are graphs showing the available transmission time, also referred to as contact time, of said satellites of FIG. 3(*a*), in an ideal case and in a real case, respectively.

The ideal case is obtained when one can select that satellite 10 of the constellation which, instant by instant, can transmit the highest power because it is closest to the target 20. In the graph of FIG. 7 it can be noticed that, in order to obtain such an optimal configuration, it would be necessary to change the transmitting satellite 10 many times during the meeting time between the constellation and a target 20, which in this example is another satellite (see FIG. 1(*b*)).

In the real case, optimized for transmitting as much power as possible, the transmitting satellite 10 is changed once at most during the meeting time.

Figure 8:
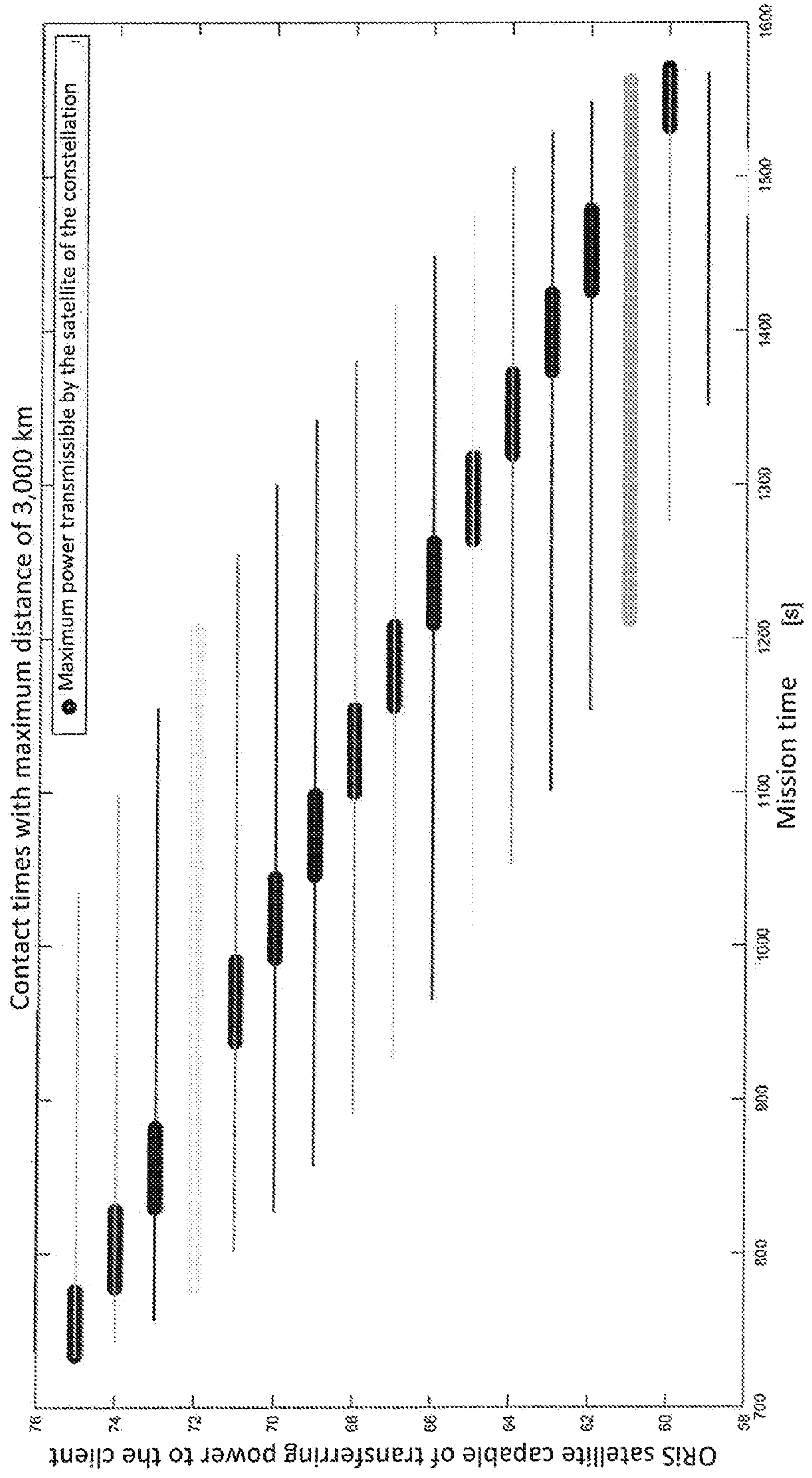

The real-case situation is illustrated in the graph of FIG. 8, wherein the actual transmission time is the sum of the highlighted segments.

This analysis has general validity as concerns the technique for the selection of the transmitting satellites.

In the ideal transmission case previously considered herein, the power received by a target satellite 20 was determined assuming an efficiency of the rectifier antenna (rectenna) 22 of 0.8.

Figure 9:
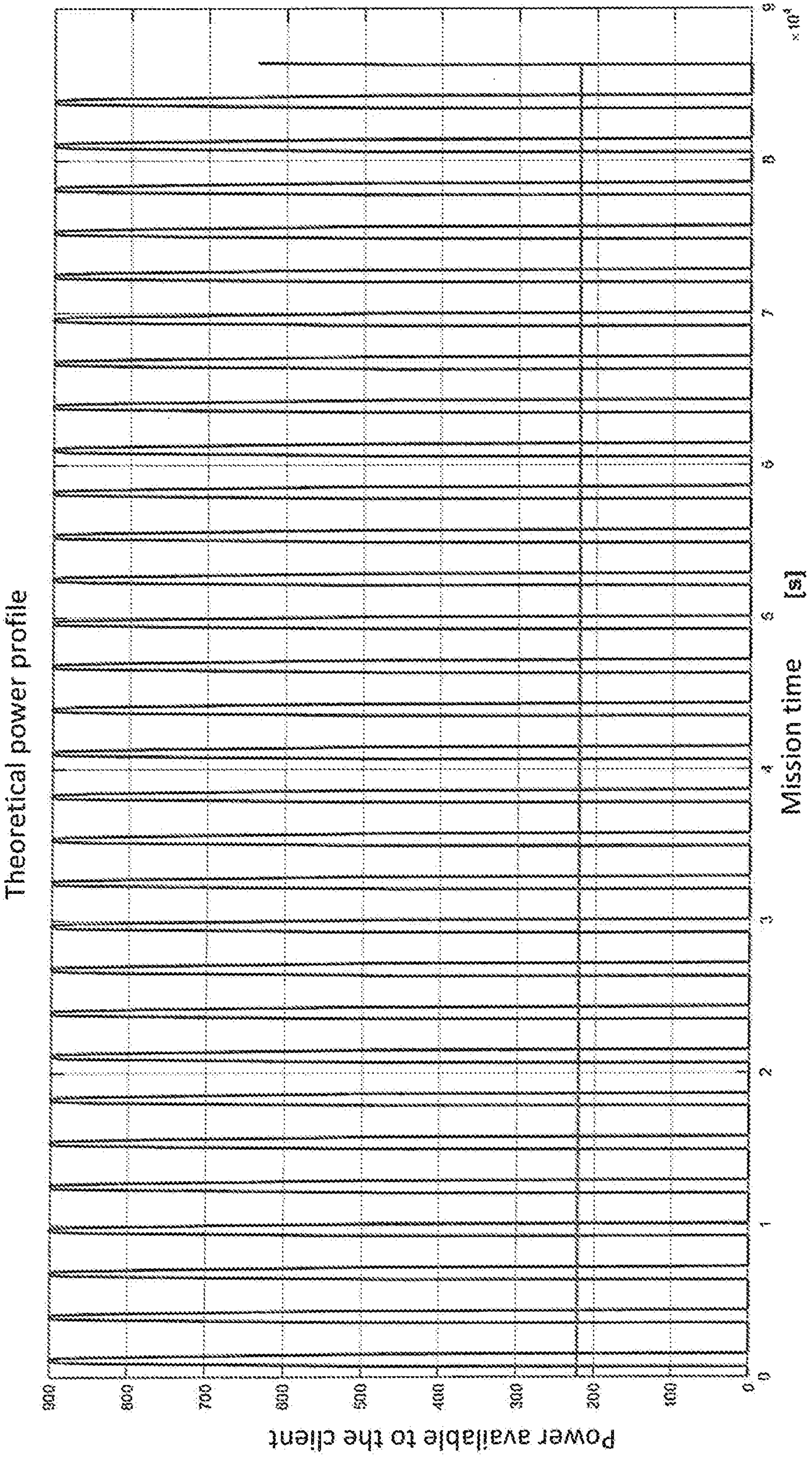
FIGS. 9 and 10 are graphs showing the profile of the power transmitted by the above satellites, in an ideal case and in a real case, respectively.
Figure 10:
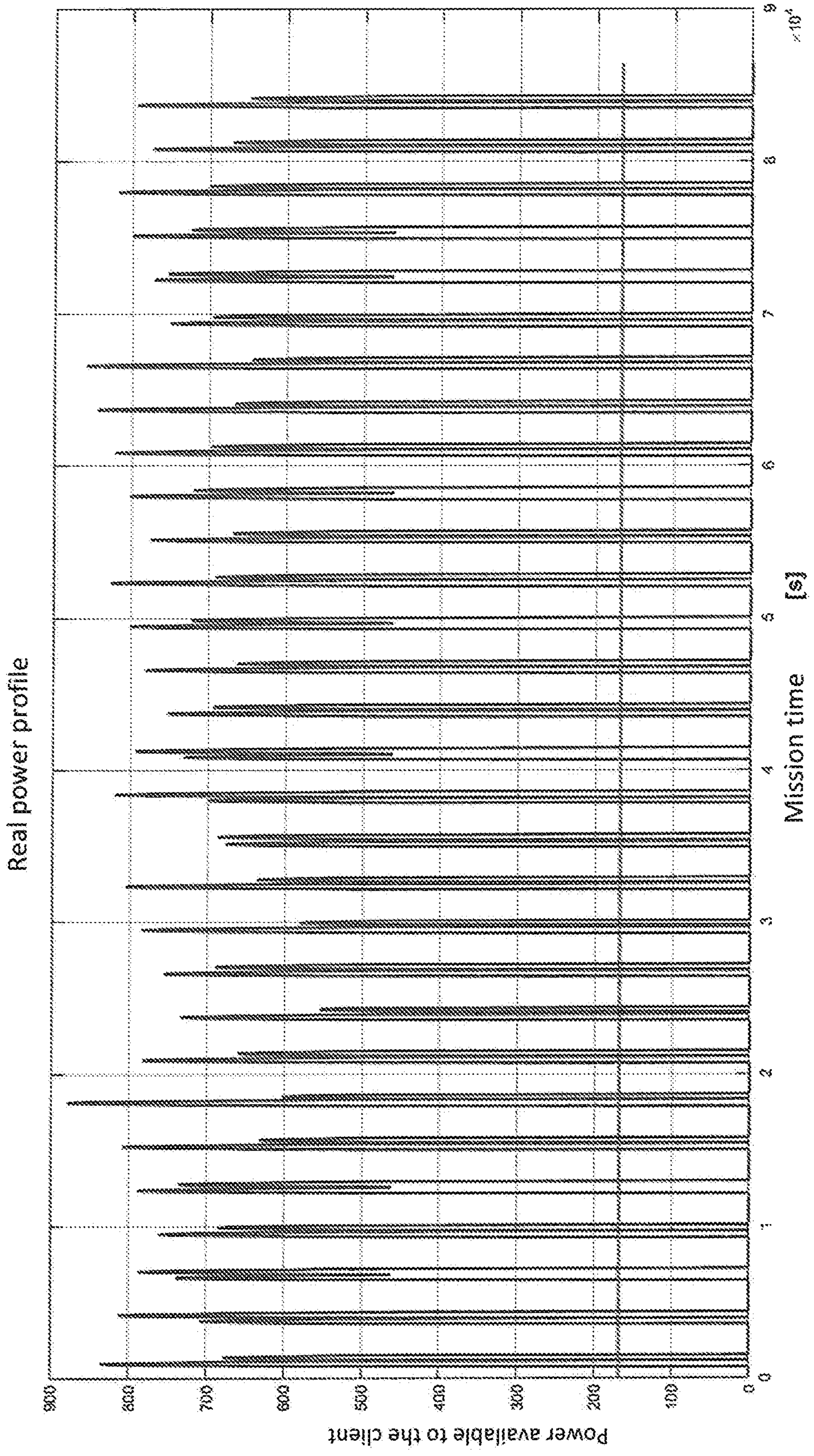

FIG. 9 shows the power profile in the ideal case, where it can be noticed that the mean power guaranteed for 24 h to a target satellite 20 is approximately 221 W, while FIG. 10 shows a power profile concerning a real case, wherein the mean power guaranteed for 24 h is approximately 167 W.

Of course, this is the power transmitted by just one energy transmitting satellite 10, so that the total power will be given by the sum of the power values transmitted by each transmitting satellite 10 to the receiving satellite or target 20.

It follows that, with a constellation of a few tens of satellites 10, power values in the range of several kW can be obtained.

For application to the celestial body Moon P, the differences are:

the meeting times between the constellation in the lunar orbit and a generic target 20 on the planet's surface; the receiving apparatus 22, which will be a structure as described below.

The constellation in lunar orbit preferably utilizes one (or more) of the four lunar frozen orbits that will minimize the need for making orbit corrections during the operating years of the orbiting satellites.

Figure 13:
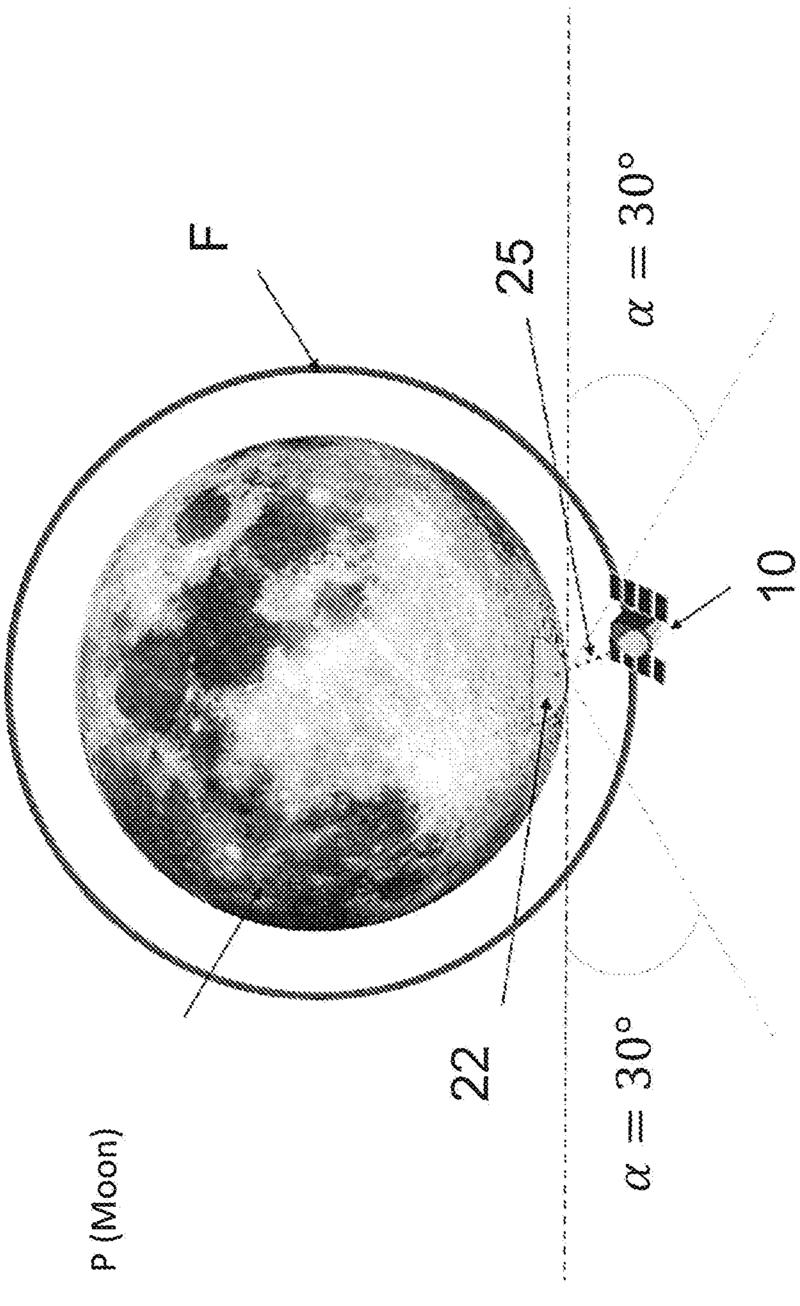
FIG. 13 shows an application of the invention to a target on the lunar soil.

In this case, for the second exemplary embodiment, the Moon base of NASA's Artemis project has been considered. Since power needs to be supplied to an actual human base (lunar habitat), the energy requirement of the generic target 20 changes, being estimated to amount to 5 KW in the night hours (in order to supply the energy required during the day, the system will have to be considerably scaled up). To send to the lunar surface the right amount of energy, a more powerful laser is employed, of the order of tens of kW. Each transmitting satellite 10 will thus be bigger and heavier. For sizing the transmitting satellite 10 and the receiver on the lunar surface, a receiver positioned at the same latitude and longitude as the point of the future moon landing of Artemis III was considered, i.e., −89.54° and 0°, respectively. An efficiency of conversion into direct current of $\eta=0.95$ and an efficiency of laser output power conversion of $\eta=0.60$ were also assumed. The laser beam reaches the surface of the target celestial body, which is provided with several receivers re-converting it into electric energy. As schematized in FIG. 13, transmission is possible when the satellite is not under solar eclipse and the elevation angle between the laser beam 25 and the receiving device 22 is $\alpha \geq 30°$. Considering a laser output power of 12 kW, with a minimum elevation angle $\alpha=30°$, the maximum distance covered by the laser beam is 1,400 km. At such distances, the minimum area of the receiver on the lunar surface is 9.6 $m^2$, with a diameter $D_{rec}=3.5$ m. It must be pointed out that such dimensions do not take into account any safety margins nor any other margins due to inaccuracy of the laser beam stabilization technology.

Figure 11:
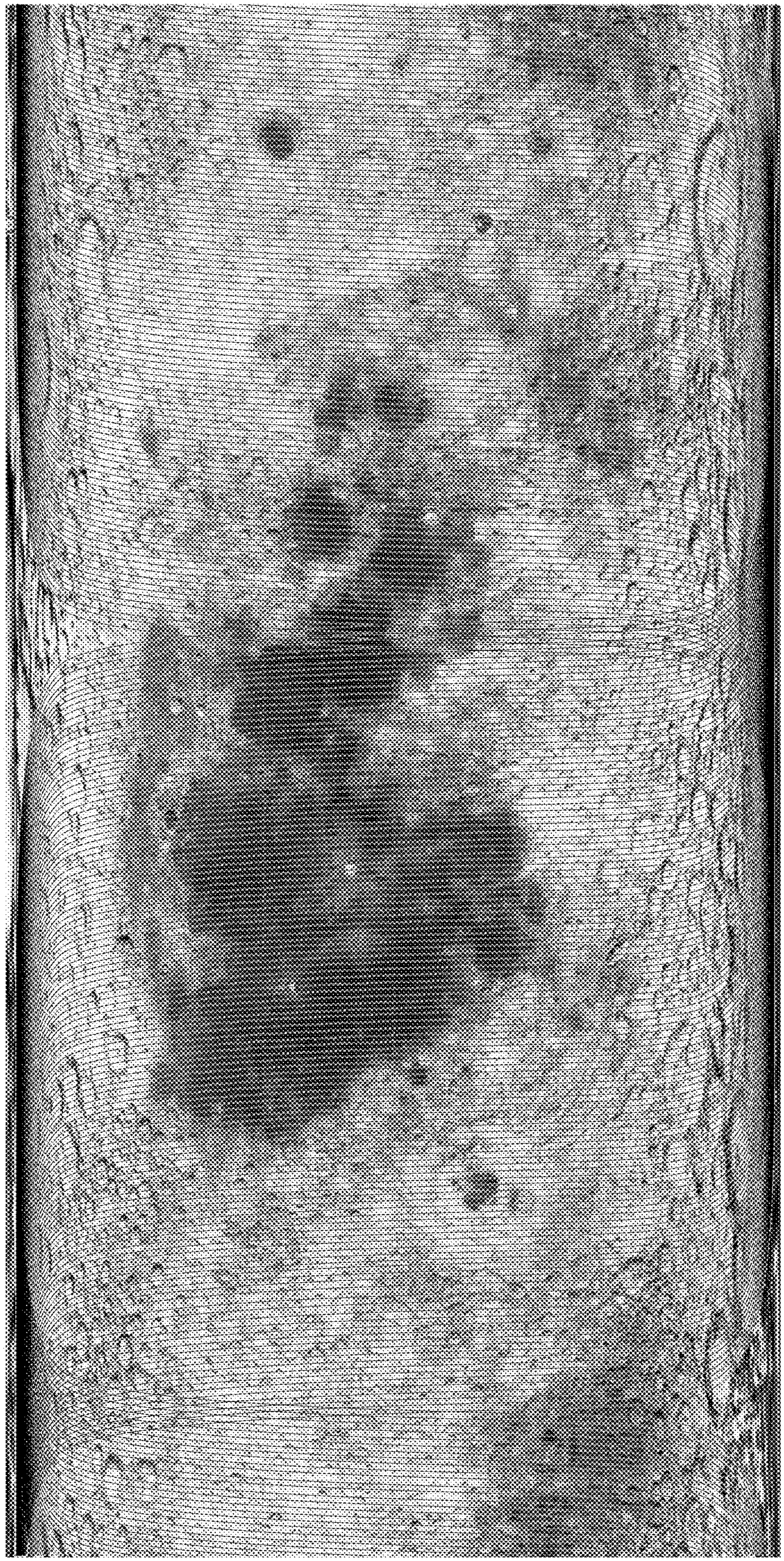
FIG. 11 shows the ground track of the constellation of satellites orbiting around the Moon.
Figure 12B:
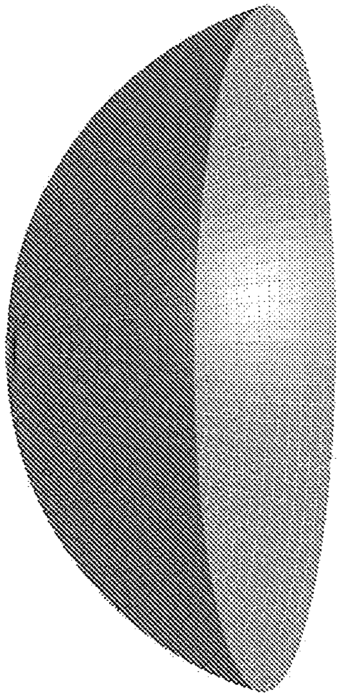
FIGS. 12(*a*), 12(*b*) show possible embodiments of the receiving apparatus 22 placed on the surface of a celestial body.
Figure 12A:
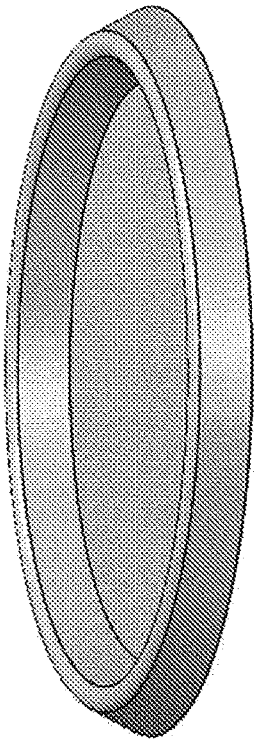

According to the above-described scenario of transmission towards a target positioned on the lunar surface, the necessary number of satellites is smaller than in the Earth case. As shown in FIG. 11, with just a few satellites it is possible obtain coverage of almost the entire lunar surface. The architecture presented by the invention consists of a number n of satellites around a celestial body other than the Earth, which in this specific example is the Moon (L), which utilize suitable frozen orbits and a laser beam transmission and reception system which is similar to the system previously described herein for the terrestrial transmission case, with some differences in the definition of the meeting times between the transmitting satellite 10 and the receiver device 20 and in the embodiment of the latter. Based on such data, it can be estimated that a constellation including 5 satellites positioned in a selected orbit at a height of approximately 600 km with an inclination i=86° will be able to send about 37,300 kWh to said Moon base located at the south pole of the Moon, where a receiver is positioned, as shown in FIG. 12(*b*), which is shaped as a spherical cap having a radius of 3.6 m and a height of 2.72 m.

From the above description one can understand how the method for wireless energy transmission and the system 1 implementing such method can solve the technical problem at the basis of the invention.

As a matter of fact, the installation of a constellation of satellites 10 as an alternative to one large orbiting station provides several improvements in the architecture of the energy transmission system, including maximization of meeting times with the receiving target 20 and total coverage of the low Earth orbit or the lunar surface.

Furthermore, since the total power transmitted is divided among a plurality of satellites 10, the contraindications due to the high temperatures of the laser apparatus 12 and of the energy source 13 necessary for operating it are limited in comparison with the case using a single transmission system with equivalent total power.

In the invention, the transmitting satellites 10 comprise a laser 12, preferably a solid-state one, sized for sending a monochromatic beam 25 adapted to transmit energy in the form of coherent electromagnetic radiations. At the receiving satellite 20 in orbit, or at a target (mobile vehicle or fixed base) on the planet P, the monochromatic beam 25 is converted by a suitable device 22, which transforms such electromagnetic energy into electric current for on-board use, e.g., for motors, propulsors, or the like.

A first configuration of the receiving apparatus 22 may comprise a matrix of optical rectifier antennas (rectennas). The latter are devices consisting of an antenna and a rectifier diode, which convert electromagnetic waves at near-infrared frequencies into direct current.

A second embodiment of the receiver element 22 comprises a matrix of photovoltaic cells designed to convert the laser-generated monochromatic beam with high efficiency.

In the case wherein the invention is implemented in a terrestrial orbit, in order to achieve wireless energy transmission in space between two points, the selected orbit for the transmitting satellites 10 is of the sun-synchronous type, more specifically of the dawn-dusk type, which advantageously ensures the longest exposure time or shortest solar eclipse time for the transmitting satellites 10, which can thus store as much energy as possible to be exploited for remote transmission.

In the case wherein the invention is implemented in a lunar orbit (F), in order to achieve wireless energy transmission between a point in space (transmitting satellite 10) and a point on the surface (target 20), the selected orbit is one of the lunar frozen orbits, i.e., by definition, a quasi-circular orbit with inclination of 28°, 51°, 76° or 86° and altitude in the range of 500 to 700 km. The selected orbit shall always be the one that ensures the shortest solar eclipse time for the transmitting satellites.

In this latter implementation, the receiving structure shall have a shape suitable for minimizing cosine losses (i.e., losses due to the angle between the electromagnetic beam and the hit surface) and for optimizing the smallest elevation angle at which the transmitting satellites 10 can transmit energy. Rather than a simple flat structure, whose efficiency would be, because of cosine losses, 82.7%, it is proposed herein to use a raise-edge shape and a dome (i.e., spherical cap) shape, as schematized in FIGS. 12(*a*), 12(*b*). In the future, following further optimization, these two configurations may be merged into one.

All of these features and variants fall within the scope of the following claims.

The invention claimed is:

1. A method for wireless transmission of energy in space, the method comprising the steps of:

providing a plurality of transmitting satellites orbiting in an orbit around a planet or a celestial body (P), each of the plurality of transmitting satellites comprising an apparatus for emitting a beam of coherent electromagnetic waves;

providing at least one target with a reception apparatus adapted to convert the beam of coherent electromagnetic waves into electric energy; and transmitting energy to the at least one target by emitting the beam of coherent electromagnetic waves from each of the plurality of transmitting satellites towards the target, wherein the reception apparatus of the at least one target substantially comprises a matrix of photovoltaic components or a matrix of rectifier antennas (rectennas).

2. The method according to claim 1, wherein the beam of coherent electromagnetic waves is a laser beam.

3. The method according to claim 1, wherein emission of the beam of coherent electromagnetic waves occurs when the distance of each emitting satellite from the at least one target is less than 3,000 km.

4. The method according to claim 1, wherein the at least one target comprises one of: an orbiting satellite, a mobile vehicle on a planet or a celestial body (P), a fixed receiver on a planet or a celestial body (P).

5. The method according to claim 1, wherein the orbit of the plurality of transmitting satellites is sun-synchronous.

6. The method according to claim 1, wherein the orbit of the plurality of transmitting satellites is a low lunar orbit (F).

7. The method according to claim 1, wherein the at least one target with a reception apparatus has a raised-edge shape or a spherical cap or dome shape.

8. A system for wireless transmission of energy in space, the system comprising:

a plurality of transmitting satellites orbiting around a planet or a celestial body (P), each of the plurality of transmitting satellites comprising an apparatus for emitting a beam of coherent electromagnetic waves;

at least one target with a reception apparatus adapted to convert the beam of coherent electromagnetic waves into electric energy, the reception apparatus comprising a receiving target equipped with at least one matrix of photovoltaic components or at least one matrix of rectifier antennas (rectennas), adapted to be irradiated by the plurality of transmitting satellites; and wherein each of the plurality of transmitting satellites transmits energy to the at least one target by emitting the beam of coherent electromagnetic waves towards the at least one target.

9. The system according to claim 8, wherein the beam of coherent electromagnetic waves is a laser beam.

10. The system according to claim 8, wherein the plurality of transmitting satellites move in the same orbit.

11. The system according to claim 8, wherein the plurality of transmitting satellites are mutually equidistant.

12. The system according to claim 8, wherein the receiving target has a raised-edge shape or a spherical cap or dome shape.

13. The method according to claim 1, wherein the reception apparatus of the at least one target substantially comprises the matrix of rectifier antennas (rectennas).

14. The method according to claim 1, wherein the at least one target with a reception apparatus has a spherical cap or dome shape each with an outer convex surface on to which the beam of coherent electromagnetic waves is directed.

15. The system according to claim 8, wherein the receiving target is equipped with the at least one matrix of rectifier antennas (rectennas).

* * * * *